United States Patent
Liu et al.

(10) Patent No.: US 12,331,989 B2
(45) Date of Patent: Jun. 17, 2025

(54) CLIP AND REFRIGERATING/FREEZING APPARATUS WITH SAME

(71) Applicants: QINGDAO HAIER REFRIGERATOR CO., LTD., Shandong (CN); HAIER SMART HOME CO., LTD., Shandong (CN)

(72) Inventors: Wenlong Liu, Qingdao (CN); Weijian Fu, Qingdao (CN); Guangrui Wu, Qingdao (CN); Xiaobin Li, Qingdao (CN)

(73) Assignees: QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 197 days.

(21) Appl. No.: 18/042,839

(22) PCT Filed: Jun. 4, 2021

(86) PCT No.: PCT/CN2021/098386
§ 371 (c)(1),
(2) Date: Feb. 24, 2023

(87) PCT Pub. No.: WO2021/219147
PCT Pub. Date: Nov. 4, 2021

(65) Prior Publication Data
US 2023/0296311 A1  Sep. 21, 2023

(30) Foreign Application Priority Data
Aug. 24, 2020  (CN) .......................... 202021781196.X

(51) Int. Cl.
*F25D 29/00* (2006.01)
*F25D 23/04* (2006.01)

(52) U.S. Cl.
CPC .......... *F25D 29/005* (2013.01); *F25D 23/04* (2013.01); *F25D 2500/06* (2013.01)

(58) Field of Classification Search
CPC .... F25D 23/04; F25D 2500/06; F25D 29/005; G06K 19/0723; G06K 19/07758
See application file for complete search history.

(56) References Cited

U.S. PATENT DOCUMENTS 9,396,369 B1 * 7/2016 Whitehurst ........ G09B 19/0092
9,940,564 B2   4/2018 Komaki
(Continued)

FOREIGN PATENT DOCUMENTS

CN  202331579 U  7/2012
CN  203233410 U  10/2013
(Continued)

OTHER PUBLICATIONS

European Search Report for European Patent Application No. 21796490.7 dated Nov. 7, 2023 (4 pages).
(Continued)

*Primary Examiner* — Henry T Crenshaw
(74) *Attorney, Agent, or Firm* — ALSTON & BIRD LLP

(57) ABSTRACT

Provided is a clip, comprising: a first clamping part, a rotary shaft being arranged thereon; a second clamping part, arranged opposite to the first clamping part, a rotary shaft hole being arranged on the second clamping part corresponding to the rotary shaft, and the rotary shaft being fitted in the rotary shaft hole to achieve a rotational connection of the first clamping part and the second clamping part; a spring, sandwiched between the first clamping part and the second clamping part; and a chip, arranged in the first clamping part and/or the second clamping part and used for storing data information. The clip of the present invention has an ingenious structure and is easy to configure. Also (Continued)

provided is a refrigerating/freezing apparatus having the clip.

14 Claims, 6 Drawing Sheets

(56) References Cited

U.S. PATENT DOCUMENTS

| | | | | |
|---|---|---|---|---|
| 10,119,753 B2* | 11/2018 | Jeong | ........... | G01N 27/4167 |
| 10,775,101 B2* | 9/2020 | Chae | ........... | G05B 19/048 |
| 11,666,160 B2* | 6/2023 | Seiss | ........... | A47J 36/24 |
| | | | | 62/130 |
| 2012/0137706 A1* | 6/2012 | Hussain | ........... | F28F 9/00 |
| | | | | 62/3.6 |
| 2013/0067937 A1* | 3/2013 | Lee | ........... | F25D 29/00 |
| | | | | 62/126 |
| 2020/0090854 A1* | 3/2020 | Schumann | ........... | C25D 3/38 |

FOREIGN PATENT DOCUMENTS

| | | |
|---|---|---|
| CN | 204635878 U | 9/2015 |
| CN | 205708041 U | 11/2016 |
| CN | 213273404 U | 5/2021 |
| JP | 2004192287 A | 7/2004 |
| JP | 2005-157694 A | 6/2005 |
| JP | 5029174 B2 | 9/2012 |

OTHER PUBLICATIONS

1$^{st}$ Office Action for European Patent Application No. 21796490.7 dated Nov. 17, 2023 (6 pages).
International Search Report and Written Opinion for PCT/CN2021/098386 (ISA/CN) mailed Aug. 26, 2021 (14 pages).

* cited by examiner

CLIP AND REFRIGERATING/FREEZING APPARATUS WITH SAME

CROSS-REFERENCE TO RELATED APPLICATIONS

The present application is a national phase entry of International Application No. PCT/CN2021/098386, filed Jun. 4, 2021, which claims priority to Chinese Application No. 202021781196.X, filed Aug. 24, 2020, which are each incorporated herein by reference in its entirety.

FIELD OF THE INVENTION

The present invention relates to the field of refrigerating and freezing storage technologies, and particularly to a clip and a refrigerating/freezing apparatus with same.

BACKGROUND OF THE INVENTION

In order to seal unsealed food, a user can seal outer packing of the food utilizing a clip as required. There exists a need for intelligent food management in a refrigerating/freezing apparatus, such as a high-end refrigerator, and an existing clip usually cannot achieve the tight sealing and intelligent management functions at the same time.

BRIEF DESCRIPTION OF THE INVENTION

An object of the present invention is to provide a clip and a refrigerating/freezing apparatus with same, which solve at least the above problem.

A further object of the present invention is to provide a clip which can be used as an electronic tag to realize intelligent management of food in a refrigerating/freezing apparatus.

In particular, the present invention provides a clip, including:
- a first clamping part, a rotary shaft being arranged thereon;
- a second clamping part, arranged opposite to the first clamping part, a rotary shaft hole being arranged on the second clamping part corresponding to the rotary shaft, and the rotary shaft being fitted in the rotary shaft hole to achieve a rotational connection of the first clamping part and the second clamping part;
- a spring, sandwiched between the first clamping part and the second clamping part; and
- a chip, arranged in the first clamping part and/or the second clamping part and used for storing data information.

Optionally, the first clamping part includes a first cover and a first clamping member, and the first clamping member is arranged on a side of the first cover close to the second clamping part;
- the second clamping part includes a second cover and a second clamping member, and the second clamping member is arranged on a side of the second cover close to the first clamping part;
- the spring is sandwiched between the first cover and the second cover; and
- outer surfaces of the first clamping member and the second clamping member are oppositely arranged to define a clamping region of the clip.

Optionally, a positioning post is formed on the first cover and/or the second cover; and
the positioning post is sleeved with the spring.

Optionally, a first limiting protrusion is formed on an inner surface of the first cover, and the rotary shafts are formed on a left side and a right side of the first limiting protrusion respectively;
- a second limiting protrusion is formed on an inner surface of the second cover, a notch is formed in a position of the second limiting protrusion corresponding to the first limiting protrusion, and the rotary shaft holes are formed in positions of a left side and a right side of the second limiting protrusion corresponding to the rotary shafts respectively, such that the first limiting protrusion is fitted at the notch, and the rotary shafts are fitted in the rotary shaft holes.

Optionally, the first clamping member is configured to have an upper end fixed to the first limiting protrusion and a lower end fixed to the first cover; and
the second clamping member is configured to have an upper end fixed to the second limiting protrusion and a lower end fixed to the second cover.

Optionally, the first clamping member is configured to have the upper end fixedly clamped to the first limiting protrusion and the lower end fixedly clamped to the first cover; and
the second clamping member is configured to have the upper end abutting against the second limiting protrusion and the lower end fixedly clamped to the second cover.

Optionally, the first cover has a first body part and a bottom wall part extending from a bottom end of the first body part towards the second cover, the first limiting protrusion is formed at an upper middle part of an inner surface of the first body part, a first gap is formed between a lower part of the first limiting protrusion and the inner surface of the first body part, and a first clamping opening is formed on an inner side surface of the bottom wall part of the first cover;
the first clamping member has a second body part as well as a top wall part and a bottom wall part which are formed by extending from a top end and a bottom end of the second body part towards the first cover respectively, a first clamping hook protruding upwards is formed on the top wall part of the first clamping member, a second clamping hook is formed on an outer side surface of the bottom wall part of the first clamping member, the first clamping hook is fixed to the first limiting protrusion through the first gap, and the second clamping hook is fitted in the first clamping opening.

Optionally, the second cover has a third body part and a bottom wall part extending from a bottom end of the third body part towards the first cover, the second limiting protrusion is formed at an upper middle part of an inner surface of the third body part, a second gap is formed between a lower part of the second limiting protrusion and the inner surface of the third body part, and a second clamping opening is formed on an inner side surface of the bottom wall part of the second cover;
the second clamping member has a fourth body part and a bottom wall part formed by extending from a bottom end of the fourth body part towards the second cover, a top end of the fourth body part abuts against a lower surface of the second limiting protrusion through the second gap, a third clamping hook is formed on an outer side surface of the bottom wall part of the second clamping member, and the third clamping hook is fitted in the second clamping opening.

Optionally, an anti-slip protrusion is arranged on the outer surface of the first clamping member and/or the second clamping member.

The present invention further provides a refrigerating/freezing apparatus, including:

a door body; and a clip assembly, arranged on an inner side of the door body and including a storage box, one or more of the clips aforementioned, an antenna board and a control board, wherein the clips, the antenna board and the control board are all arranged in the storage box, the chip is used for storing food information, and the control board is configured to read the food information stored on the chip by the antenna board.

In the present invention, the clip is set to include the first clamping part, the second clamping part, the spring and the chip, such that the clip can be used as an electronic tag; meanwhile, the rotary shaft is arranged on the first clamping part, the rotary shaft hole is arranged on the second clamping part, which is arranged opposite to the first clamping part, corresponding to the rotary shaft, and the rotary shaft is fitted in the rotary shaft hole to realize the rotational connection of the first clamping part and the second clamping part; the spring is sandwiched between the first clamping part and the second clamping part, such that the clip has an ingenious structure and easy to configure and use, and is particularly suitable for being used in a refrigerating/freezing apparatus, such as a high-end refrigerator, to dynamically monitor food, thereby realizing intelligent food management, and improving the intelligence of the refrigerating/freezing apparatus.

Further, the first clamping part of the clip according to the present invention includes the first cover and the first clamping member, the second clamping part includes the second cover and the second clamping member, the spring is sandwiched between the first cover and the second cover, and the outer surfaces of the first clamping member and the second clamping member are oppositely arranged to define the clamping region of the clip, such that the clip has an ingenious overall design and a compact structure.

Further, the first clamping member of the clip according to the present invention is configured to have the upper end fixed to the first limiting protrusion and the lower end fixed to the first cover; the second clamping member is configured to have the upper end fixed to the second limiting protrusion, and the lower end fixed to the second cover, such that stable assembly of components is guaranteed, and the clip is not prone to deformation and has a long service life.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings.

DETAILED DESCRIPTION

Embodiments of the present invention provide a clip 200 and a refrigerating/freezing apparatus with same, and the refrigerating/freezing apparatus can be an apparatus with refrigerating and freezing functions, such as a refrigerator, a freezer, or the like. The clip 200 and the refrigerating/freezing apparatus according to the embodiments will be described in detail below with reference to FIGS. 1 to 6. Herein, for convenience of description, "front", "rear", "left", "right", "upper" and "lower" in the structural description of the clip 200 are explained with reference to the directions in FIG. 1, and it may be understood that the clip 200 may be vertically placed as shown in FIG. 1, or obliquely or horizontally placed during application.

Figure 1:
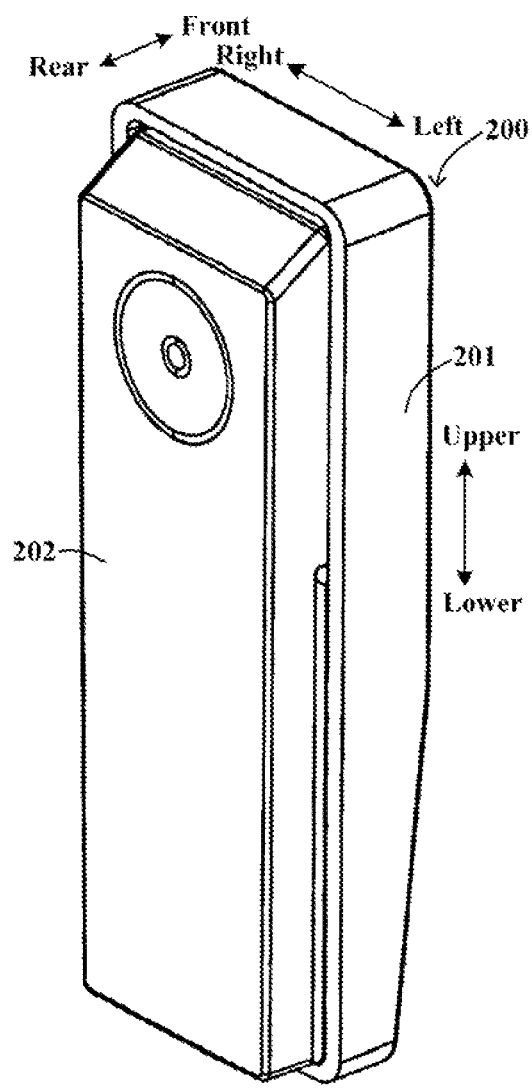
FIG. 1 is a schematic perspective structural diagram of a clip according to an embodiment of the present invention.
Figure 2:
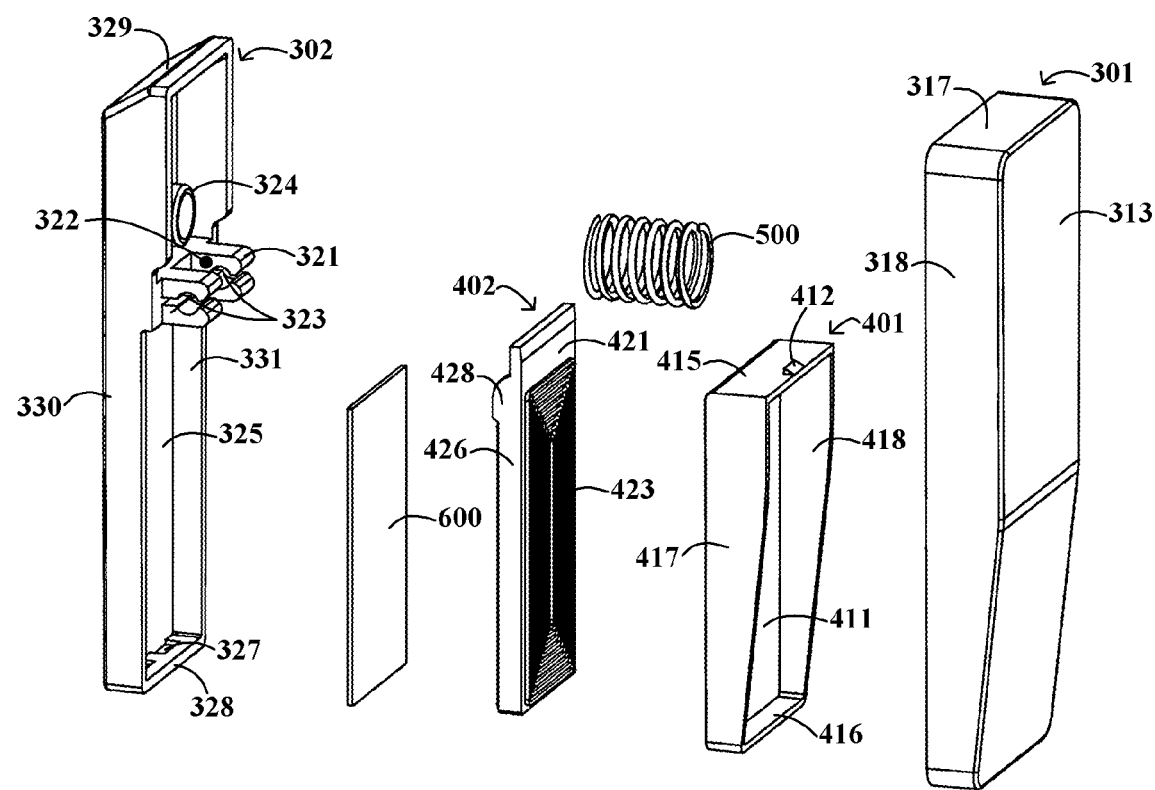
FIG. 2 is a schematic exploded diagram of the clip shown in FIG. 1.
Figure 3:
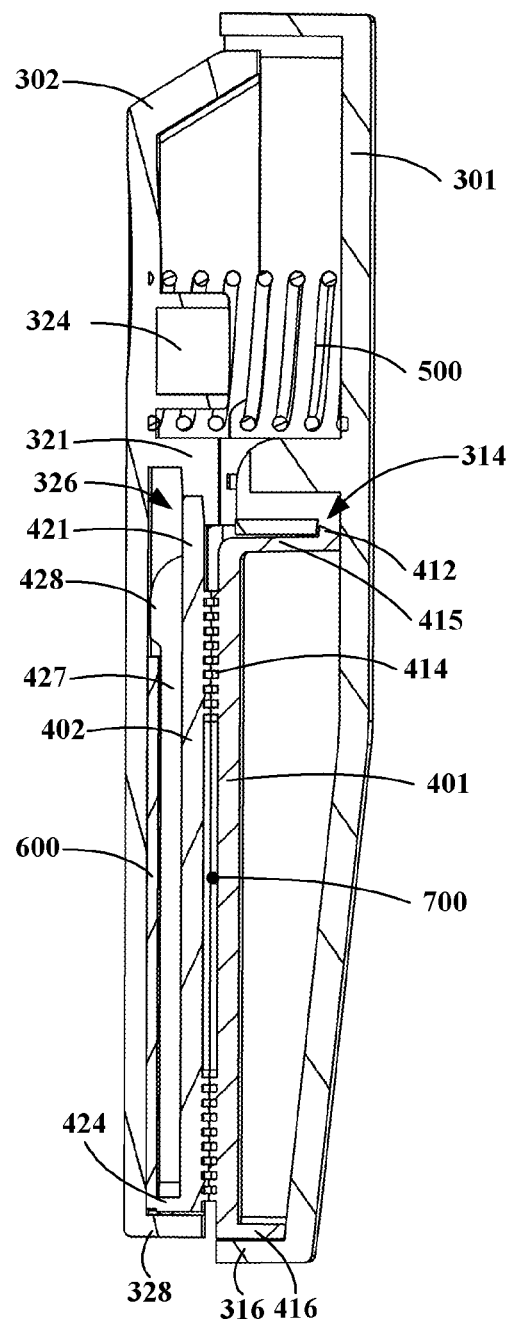
FIG. 3 is a schematic sectional diagram of the clip shown in FIG. 1.
Figure 4:
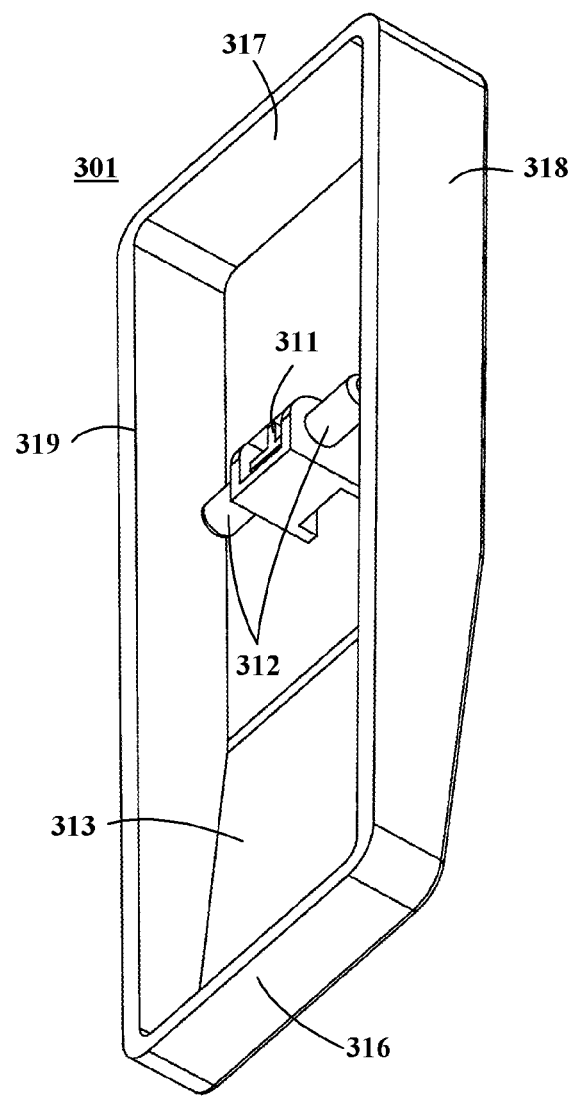
FIG. 4 is a schematic perspective structural diagram of a first cover of the clip shown in FIG. 1.

FIG. 1 is a schematic perspective structural diagram of a clip 200 according to an embodiment of the present invention. FIG. 2 is a schematic exploded diagram of the clip 200 shown in FIG. 1. FIG. 3 is a schematic sectional diagram of the clip 200 shown in FIG. 1. FIG. 4 is a schematic perspective structural diagram of a first cover 301 of the clip 200 shown in FIG. 1.

As shown in FIGS. 1 and 3, the clip 200 according to the embodiment of the present invention may include: a first clamping part 201, a second clamping part 202, a spring 500 and a chip 600. A rotary shaft 312 is arranged on the first clamping part 201. The second clamping part 202 is arranged opposite to the first clamping part 201, a rotary shaft hole 323 is arranged on the second clamping part 202 corresponding to the rotary shaft 312, and the rotary shaft 312 is fitted in the rotary shaft hole 323 to achieve a rotational connection of the first clamping part 201 and the second clamping part 202. The spring 500 is sandwiched between the first clamping part 201 and the second clamping part 202. The chip 600 is arranged in the first clamping part 201 and/or the second clamping part 202 and used for storing data information. The first clamping part 201 and the second clamping part 202 are rotationally connected by the interference fit of the rotary shaft 312 and the rotary shaft hole 323, and controllably rotate by compression deformation of the spring 500. For example, when the clip 200 is in an idle state, that is, not used, the spring 500 is in an initial state and does not elastically deform, and at this point, inner side surfaces of sides of the first clamping part 201 and the second clamping part 202 apart from the spring 500 are attached; when the spring 500 is stressed to be compressed, ends of the sides of the first clamping part 201 and the second clamping part 202 apart from the spring 500 get away from each other to form a gap between the first clamping part 201 and the second clamping part 202, which is convenient for a user to place an article in the gap between the first clamping part 201 and the second clamping part 202; after the article is placed in the gap, a force is no longer applied to the spring 500, the spring 500 is partially restored from the deformation, and the ends of the sides of the first clamping part 201 and the second clamping part 202 apart from the spring 500 get close to each other to form a clamping force between the clip 200 and the article; when the clip 200 is required to be removed, a force is applied to the spring 500 again, and the ends of the sides of the first clamping part 201 and the second clipping part 202 apart from the spring 500 get away from each other again, such that the clip 200 can be removed from the article.

In the embodiment of the present invention, the clip 200 is set to include the first clamping part 201, the second clamping part 202, the spring 500 and the chip 600, and the chip 600 is used for storing the data information, such as food information, such that the clip 200 can be used as an electronic tag; meanwhile, the rotary shaft 312 is arranged on the first clamping part 201, the rotary shaft hole 323 is arranged on the second clamping part 202, which is arranged opposite to the first clamping part 201, corresponding to the rotary shaft 312, and the rotary shaft 312 is fitted in the rotary shaft hole 323 to realize the rotational connection of the first clamping part 201 and the second clamping part 202; the spring 500 is sandwiched between the first clamping part 201 and the second clamping part 202, such that the clip 200 has an ingenious structure and easy to configure and use, and is particularly suitable for being used in a refrigerating/freezing apparatus, such as a high-end refrigerator, to dynamically monitor food, thereby realizing intelligent food management, and improving the intelligence of the refrigerating/freezing apparatus.

Figure 5:
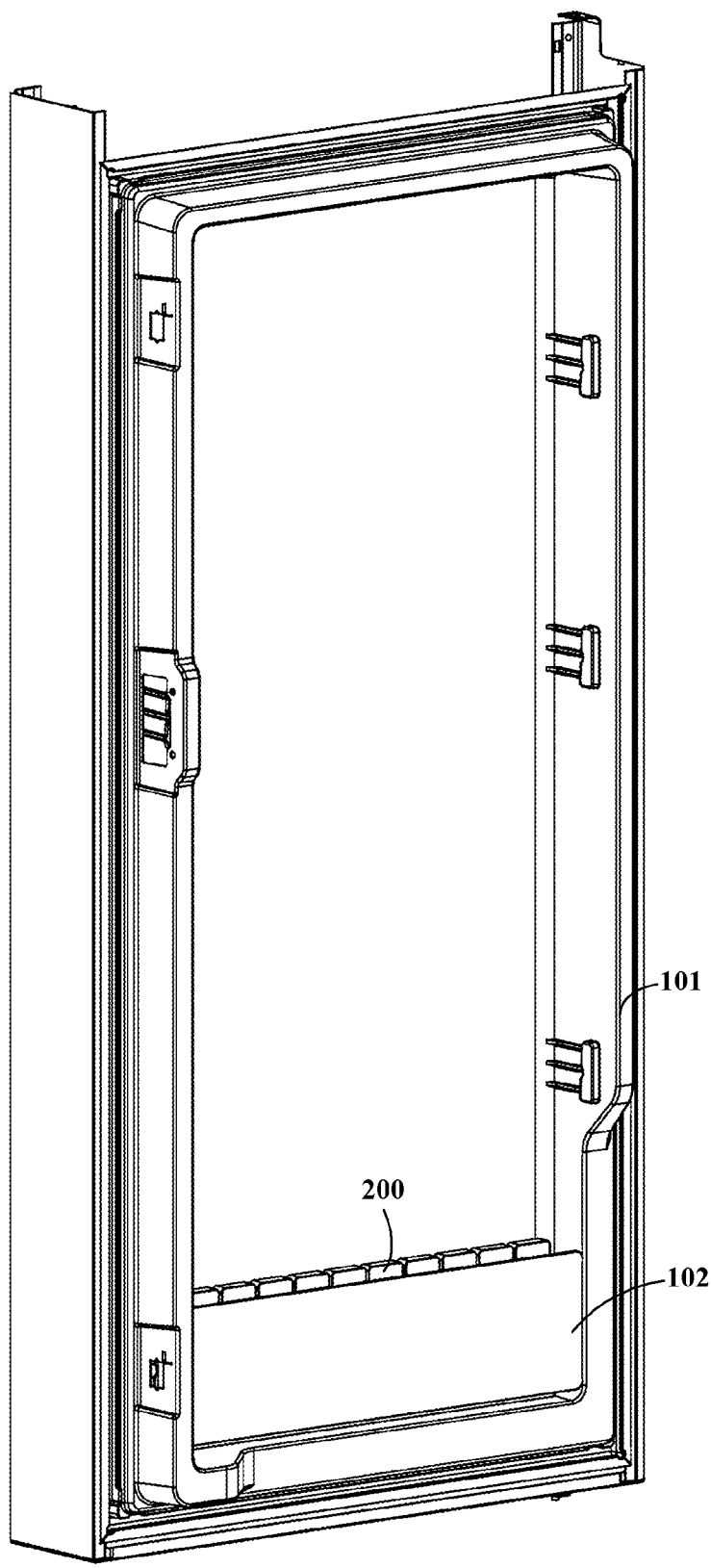
FIG. 5 is a schematic diagram of a combined structure of a door body and a clip of a refrigerating/freezing apparatus according to an embodiment of the present invention.
Figure 6:
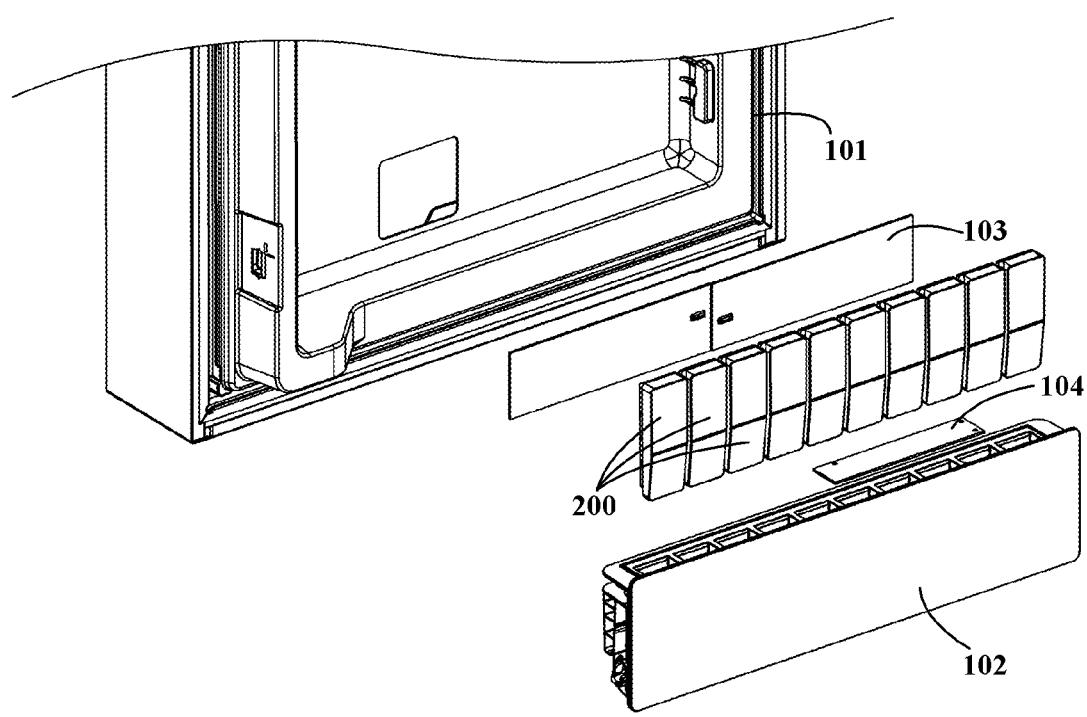
FIG. 6 is a schematic partial enlarged diagram of FIG. 5.

The first clamping part 201 and the second clamping part 202 may be an integral structure or a split structure. To facilitate placement and removal of the chip 600, as shown in FIGS. 2 and 3, in some embodiments, the first clamping part 201 includes a first cover 301 and a first clamping member 401, and the first clamping member 401 is arranged on a side of the first cover 301 close to the second clamping part 202; the second clamping part 202 includes a second cover 302 and a second clamping member 402, and the second clamping member 402 is arranged on a side of the second cover 302 close to the first clamping part 201; the spring 500 is sandwiched between the first cover 301 and the second cover 302; outer surfaces of the first clamping members 401 and the second clamping member 402 are oppositely arranged to define a clamping region 700 of the clip 200. The first clamping part 201 of the clip 200 according to the embodiment of the present invention includes the first cover 301 and the first clamping member 401, the second clamping part 202 includes the second cover 302 and the second clamping member 402, the spring 500 is sandwiched between the first cover 301 and the second cover 302, and the outer surfaces of the first clamping member 401 and the second clamping member 402 are oppositely arranged to define the clamping region 700 of the clip 200, such that the clip has an ingenious overall design and a compact structure, and the chip 600 is easy to place and replace. The chip 600 may be arranged within the first clamping part 201, that is, located between the first cover 301 and the first clamping member 401, or may be arranged within the second clamping part 202, that is, located between the second cover 302 and the second clamping member 402. In consideration of sensing of the chip 600, as shown in FIGS. 5 and 6, during application to an inner side of a door body 101 of a refrigerator, the first cover 301 is apart from the inner side of the door body 101, the second cover 302 is close to the inner side of the door body 101, and the chip 600 is arranged in the second clamping part 202 and close to the second cover 302, as shown in FIG. 3, so as to facilitate the arrangement of an antenna board 103 and wiring.

With continued reference to FIGS. 2 and 3, in some embodiments, a positioning post 324 is arranged on the first cover 301 and/or the second cover 302; and the positioning post 324 is sleeved with the spring 500. In the embodiment shown in FIG. 2, the positioning post 324 is formed on the second cover 302. By providing the positioning post 324, a position of the spring 500 between the first cover 301 and the second cover 302 can be defined to avoid failure of the clip 200 caused by a position shift or integral inclination of the spring 500.

As shown in FIGS. 2 and 4, a first limiting protrusion 311 is formed on an inner surface of the first cover 301, and the rotary shafts 312 are formed on a left side and a right side of the first limiting protrusion 311 respectively; a second limiting protrusion 321 is formed on an inner surface of the second cover 302, a notch 322 is formed in a position of the second limiting protrusion 321 corresponding to the first limiting protrusion 311, and the rotary shaft holes 323 are formed in positions of a left side and a right side of the second limiting protrusion 321 corresponding to the rotary shafts 312 respectively, such that the first limiting protrusion 311 is fitted at the notch 322, and the rotary shafts 312 are fitted in the rotary shaft holes 323. The notch 322 is arranged on the second limiting protrusion 321, the first limiting protrusion 311 is fitted in the notch 322, and meanwhile, the rotary shafts 312 on the two sides are fitted in the rotary shaft holes 323 on the two sides respectively, such that a rotary structure of the first cover 301 and the second cover 302 is quite reliable, and the use stability of the clip 200 is high.

In some embodiments, the first clamping member 401 may be configured to have an upper end fixed to the first limiting protrusion 311 and a lower end fixed to the first cover 301; the second clamping member 402 may be configured to have an upper end fixed to the second limiting protrusion 321 and a lower end fixed to the second cover 302. Specifically, in the embodiment shown in FIGS. 2 to 4, the first clamping member 401 may be configured to have the upper end fixedly clamped to the first limiting protrusion 311 and the lower end fixedly clamped to the first cover 301; the second clamping member 402 may be configured to have the upper end abutting against the second limiting protrusion 321 and the lower end fixedly clamped to the second cover 302. The first clamping member 401 of the clip 200 according to the embodiment of the present invention is configured to have the upper end fixed to the first limiting protrusion 311 and the lower end fixed to the first cover 301; the second clamping member 402 is configured to have the upper end fixed to the second limiting protrusion 321, and the lower end fixed to the second cover 302, such that stable assembly of components is guaranteed, and the clip is not prone to deformation and has a long service life.

Referring to FIGS. 2 and 3, the first cover 301 has a first body part 313 and a bottom wall part 316 extending from a bottom end of the first body part 313 towards the second cover 302, the first limiting protrusion 311 is formed at an upper middle part of an inner surface of the first body part 313, a first gap 314 is formed between a lower part of the first limiting protrusion 311 and the inner surface of the first body part 313, and a first clamping opening (not shown in the figures) is formed on an inner side surface of the bottom wall part 316 of the first cover 301. The first clamping member 401 has a second body part 411 as well as a top wall part 415 and a bottom wall part 416 which are formed by extending from a top end and a bottom end of the second body part 411 towards the first cover 301 respectively, a first clamping hook 412 protruding upwards is formed on the top wall part 415 of the first clamping member 401, a second clamping hook (not shown in the figures) is formed on an outer side to surface of the bottom wall part 416 of the first clamping member 401, the first clamping hook 412 is fixed to the first limiting protrusion 311 through the first gap 314, and the second clamping hook is fitted in the first clamping opening. The first cover 301 and the first clamping member 401 of the clip 200 according to the embodiment of the present invention achieve close fit by means of the first gap 314, the first clamping hook 412, the first clamping opening and the second clamping hook, and meanwhile, since the first clamping member 401 actually provides the clamping region 700, the outer shape of the first cover 301 may be specially designed, so as to make the appearance of the entire clip 200 better.

With continued reference to FIGS. 2 and 3, the second cover 302 has a third body part 325 and a bottom wall part 328 extending from a bottom end of the third body part 325 towards the first cover 301, the second limiting protrusion 321 is formed at an upper middle part of an inner surface of the third body part 325, a second gap 326 is formed between a lower part of the second limiting protrusion 321 and the inner surface of the third body part 325, and a second clamping opening 327 is formed on an inner side surface of the bottom wall part 328 of the second cover 302. The second clamping member 402 has a fourth body part 421 and a bottom wall part 424 formed by extending from a bottom end of the fourth body part 421 towards the second cover 302, a top end of the fourth body part 421 abuts against a lower surface of the second limiting protrusion 321 through the second gap 326, a third clamping hook (not shown in the figures) is formed on an outer side surface of the bottom wall part 424 of the second clamping member 402, and the third clamping hook is fitted in the second clamping opening 327. The second cover 302 and the second clamping member 402 of the clip 200 according to the embodiment of the present invention realize close fit by the abutment of the fourth body part 421 via the second gap 326, the second clamping opening 327 and the third clamping hook. Meanwhile, as described above, in consideration of the application scenario of the clip 200 in a refrigerator, the chip 600 is preferably arranged between the second cover 302 and the second clamping member 402, and the insertion and removal of the chip 600 can be facilitated by a fixing structure in which abutment is performed on one side and clamping is performed on the other side. As shown in FIGS. 2 and 3, an arc-shaped limiting protrusion 428 is preferably formed on a side of the fourth body part 421 facing the third body part 325 in an extension mode, so as to facilitate assembly of the second clamping member 402. Furthermore, an anti-slip protrusion 414 is further arranged on the outer surface of the first clamping member 401, and an anti-slip protrusion 423 is further arranged on the outer surface of the second clamping member 402, so as to further enhance the clamping performance of the clip 200.

As shown in FIGS. 1 to 4, the first body part 313 of the first cover 301 forms a folded structure having a vertical section and an inclined section, and a top wall part 317, a left side wall part 318, a right side wall part 319, and the bottom wall part 316 are formed around the first body part 313. The second body part 411 of the first clamping member 401 has a planar structure, and the top wall part 415, a left side wall part 417, a right side wall part 418, and the bottom wall part 416 are also formed around the second body part 411. The second body part 411 is spaced apart from the first body part 313, the top wall part 415 of the first clamping to member 401 abuts against a lower surface of the first limiting protrusion 311, the left side wall part 417 abuts against an inner surface of the left side wall part 318 of the first cover 301, the right side wall part 418 abuts against an inner surface of the right side wall part 319 of the first cover 301, and the bottom wall part 416 abuts against an inner surface of the bottom wall part 316 of the first cover 301, such that the first clamping member 401 is completely wrapped in the first cover 301. The third body part 325 of the second cover 302 has a planar structure, and a top wall part 329, a left side wall part 330, a right side wall part 331, and the bottom wall part 328 are formed around the third body part 325. The fourth body part 421 of the second clamping member 402 has a planar structure, and a left side wall part 426, a right side wall part 427, and the bottom wall part 424 are formed on three sides of the fourth body part 421 respectively. The third body part 325 is spaced apart from the fourth body part 421, the left side wall part 426 of the second clamping member 402 abuts against an inner surface of the left side wall part 330 of the second cover 302, the right side wall part 427 abuts against an inner surface of the right side wall part 331 of the second cover 302, and the bottom wall part 424 abuts against an inner surface of the bottom wall part 328 of the second cover 302, such that the second clamping member 402 is completely wrapped in the second cover 302. Meanwhile, the overall vertical height and lateral width of the second cover 302 are less than those of the first cover 301, such that only an outer surface of the first body part 313 of the first cover 301 can be seen in a front view structure of the clip 200. With these detail designs, the overall appearance of the clip 200 is made quite attractive.

The clip 200 may be applied to any situation where an electronic tag is required, such as a refrigerating/freezing apparatus. FIG. 5 is a schematic diagram of a combined structure of a door body 101 and a clip 200 of a refrigerating/freezing apparatus according to an embodiment of the present invention. FIG. 6 is a schematic partial enlarged diagram of FIG. 5. The refrigerating/freezing apparatus according to the embodiment of the present invention includes: a door body 101 and a clip assembly. When the refrigerating/freezing apparatus is a refrigerator, the refrigerating/freezing apparatus further includes a cabinet defining a storage compartment, the door body 101 is arranged on a front side of the cabinet in an openable and closable manner, and in the refrigerator, a vapor compression refrigeration system may be adopted for refrigeration. The clip assembly is arranged on an inner side of the door body 101 and includes a storage box 102, one or more clips 200, an antenna board 103 and a control board 104. By arranging the clip assembly on the inner side of the door body 101 of the refrigerating/freezing apparatus, the user can conveniently take and use the clip assembly. The clips 200, the antenna board 103, and the control board 104 are all arranged in the storage box 102. The storage box 102 may be detachably accommodated on the inner side of the door body 101. The specific structure of the storage box 102 may be any structure capable of storing the clips 200, the antenna board 103, and the control board 104, and will not be described in detail here.

The chip 600 is used for storing food information. The control board 104 is configured to read the food information stored on the chip 600 through the antenna board 103. When the clip assembly includes a plurality of clips 200, correspondingly, the number of the chips 600 is also multiple, each clip 200 corresponds to one chip 600, and the food information contained in different chips 600 can be different; that is, each chip 600 can correspond to one kind of food, and the plurality of chips 600 correspond to a plurality of different kinds of food, such that the various kinds of food can be managed conveniently. The food information may include a food type, a food shelf life, or the like. When a certain kind of food is put into the refrigerating/freezing apparatus, the user can take and use the clip 200 corresponding to the food to clip the food or outer packing of the food, and meanwhile, the control board 104 reads the food type corresponding to the chip 600 in the taken clip 200 through the antenna board 103, and records the time of taking the chip 600 as an initial time of putting the food into the refrigerating/freezing apparatus; and when the shelf life of the food is about to end and the food is still not eaten up, the control board 104 sends out reminding information to remind the user that the shelf life of the food is about to expire, and the user is reminded of timely eating to avoid waste of the food. The foregoing chip 600 may be an NFC chip or an RFID chip, and when the chip 600 is taken out with the corresponding clip 200, a distance between the chip 600 and the antenna board 103 is relatively large, the control board 104 may scan the chip 600 still stored in the storage box 102 through the antenna board 103, and the chip 600 which is not scanned is the taken-out chip 600, such that the information of the food in the refrigerating/freezing apparatus may be updated.

So far, those skilled in the art should be aware that, although plural exemplary embodiments of the present invention have been shown and described herein in detail, a lot of other variations or modifications conforming to the principle of the present invention can still be directly determined or derived from the contents disclosed in the present invention without departing from the spirit and scope of the present invention. Therefore, the scope of the present invention should be understood and deemed as covering all of these other variations or modifications.

What is claimed is:

1. A clip, comprising:
a first clamping part, a rotary shaft being arranged thereon;
a second clamping part, arranged opposite to the first clamping part, a rotary shaft hole being arranged on the second clamping part corresponding to the rotary shaft, and the rotary shaft being fitted in the rotary shaft hole to achieve a rotational connection of the first clamping part and the second clamping part;
a spring, sandwiched between the first clamping part and the second clamping part; and
a chip, arranged in the first clamping part and/or the second clamping part and used for storing data information,
wherein the first clamping part comprises a first cover and a first clamping member, and the first clamping member is arranged on a side of the first cover close to the second clamping part;
wherein the second clamping part comprises a second cover and a second clamping member, and the second clamping member is arranged on a side of the second cover close to the first clamping part;
wherein the spring is sandwiched between the first cover and the second cover;
wherein outer surfaces of the first clamping member and the second clamping member are oppositely arranged to define a clamping region of the clip, wherein
wherein a first limiting protrusion is formed on an inner surface of the first cover, and the rotary shafts are formed by extending outwards from a left side and a right side of the first limiting protrusion respectively; and
wherein a second limiting protrusion is formed on an inner surface of the second cover, a notch is formed in a position of the second limiting protrusion corresponding to the first limiting protrusion, and the rotary shaft holes are formed in positions of a left side and a right side of the second limiting protrusion corresponding to the rotary shafts respectively, such that the first limiting protrusion is fitted at the notch, and the rotary shafts are fitted in the rotary shaft holes.

2. The clip according to claim 1, wherein
a positioning post is formed on an inner surface of the first cover and/or the second cover; and
the positioning post is sleeved with the spring.

3. The clip according to claim 1, wherein
the first clamping member is configured to have an upper end fixed to the first limiting protrusion and a lower end fixed to the first cover; and
the second clamping member is configured to have an upper end fixed to the second limiting protrusion and a lower end fixed to the second cover.

4. The clip according to claim 3, wherein
the first clamping member is configured to have the upper end fixedly clamped to the first limiting protrusion and the lower end fixedly clamped to the first cover; and
the second clamping member is configured to have the upper end abutting against the second limiting protrusion and the lower end fixedly clamped to the second cover.

5. The clip according to claim 4, wherein
the first cover has a first body part and a bottom wall part extending from a bottom end of the first body part towards the second cover, the first limiting protrusion is formed at an upper middle part of an inner surface of the first body part, a first gap is formed between a lower part of the first limiting protrusion and the inner surface of the first body part, and a first clamping opening is formed on an inner side surface of the bottom wall part of the first cover;
the first clamping member has a second body part as well as a top wall part and a bottom wall part which extend from a top end and a bottom end of the second body part towards the first cover respectively, a first clamping hook protruding upwards is formed on the top wall part of the first clamping member, a second clamping hook is formed on an outer side surface of the bottom wall part of the first clamping member, the first clamping hook is fixed to the first limiting protrusion through the first gap, and the second clamping hook is fitted in the first clamping opening.

6. The clip according to claim 4, wherein
the second cover has a third body part and a bottom wall part extending from a bottom end of the third body part towards the first cover, the second limiting protrusion is formed at an upper middle part of an inner surface of the third body part, a second gap is formed between a lower part of the second limiting protrusion and the inner surface of the third body part, and a second clamping opening is formed on an inner side surface of the bottom wall part of the second cover;
the second clamping member has a fourth body part and a bottom wall part formed by extending from a bottom end of the fourth body part towards the second cover, a top end of the fourth body part abuts against a lower surface of the second limiting protrusion through the second gap, a third clamping hook is formed on an outer side surface of the bottom wall part of the second clamping member, and the third clamping hook is fitted in the second clamping opening.

7. The clip according to claim 1, wherein
an anti-slip protrusion is arranged on the outer surface of the first clamping member and/or the second clamping member.

8. A refrigerating/freezing apparatus, comprising:
a door body; and
a clip assembly, arranged on an inner side of the door body and comprising a storage box, one or more clips according to claim 1, an antenna board and a control board, wherein the clips, the antenna board and the control board are all arranged in the storage box, the chip is used for storing food information, and the control board is configured to read the food information stored on the chip by the antenna board.

9. A clip, comprising:
a first clamping part, a rotary shaft being arranged thereon;
a second clamping part, arranged opposite to the first clamping part, a rotary shaft hole being arranged on the second clamping part corresponding to the rotary shaft, and the rotary shaft being fitted in the rotary shaft hole to achieve a rotational connection of the first clamping part and the second clamping part;
a spring, sandwiched between the first clamping part and the second clamping part; and
a chip, arranged in the first clamping part and/or the second clamping part and used for storing data information, wherein
the first clamping part comprises a first cover and a first clamping member, and the first clamping member is arranged on a side of the first cover close to the second clamping part;
the second clamping part comprises a second cover and a second clamping member, and the second clamping member is arranged on a side of the second cover close to the first clamping part;
the spring is sandwiched between the first cover and the second cover; and
outer surfaces of the first clamping member and the second clamping member are oppositely arranged to define a clamping region of the clip, wherein
an anti-slip protrusion is arranged on the outer surface of the first clamping member and/or the second clamping member.

10. The clip according to claim 9, wherein
a positioning post is formed on an inner surface of the first cover and/or the second cover; and
the positioning post is sleeved with the spring.

11. The clip according to claim 9, wherein
a first limiting protrusion is formed on an inner surface of the first cover, and the rotary shafts are formed by extending outwards from a left side and a right side of the first limiting protrusion respectively;
a second limiting protrusion is formed on an inner surface of the second cover, a notch is formed in a position of the second limiting protrusion corresponding to the first limiting protrusion, and the rotary shaft holes are formed in positions of a left side and a right side of the second limiting protrusion corresponding to the rotary shafts respectively, such that the first limiting protrusion is fitted at the notch, and the rotary shafts are fitted in the rotary shaft holes, wherein
the first clamping member is configured to have an upper end fixed to the first limiting protrusion and a lower end fixed to the first cover; and
the second clamping member is configured to have an upper end fixed to the second limiting protrusion and a lower end fixed to the second cover.

12. The clip according to claim 11, wherein
the first clamping member is configured to have the upper end fixedly clamped to the first limiting protrusion and the lower end fixedly clamped to the first cover; and
the second clamping member is configured to have the upper end abutting against the second limiting protrusion and the lower end fixedly clamped to the second cover.

13. The clip according to claim 12, wherein
the first cover has a first body part and a bottom wall part extending from a bottom end of the first body part towards the second cover, the first limiting protrusion is formed at an upper middle part of an inner surface of the first body part, a first gap is formed between a lower part of the first limiting protrusion and the inner surface of the first body part, and a first clamping opening is formed on an inner side surface of the bottom wall part of the first cover;
the first clamping member has a second body part as well as a top wall part and a bottom wall part which extend from a top end and a bottom end of the second body part towards the first cover respectively, a first clamping hook protruding upwards is formed on the top wall part of the first clamping member, a second clamping hook is formed on an outer side surface of the bottom wall part of the first clamping member, the first clamping hook is fixed to the first limiting protrusion through the first gap, and the second clamping hook is fitted in the first clamping opening.

14. The clip according to claim 12, wherein
the second cover has a third body part and a bottom wall part extending from a bottom end of the third body part towards the first cover, the second limiting protrusion is formed at an upper middle part of an inner surface of the third body part, a second gap is formed between a lower part of the second limiting protrusion and the inner surface of the third body part, and a second clamping opening is formed on an inner side surface of the bottom wall part of the second cover;
the second clamping member has a fourth body part and a bottom wall part formed by extending from a bottom end of the fourth body part towards the second cover, a top end of the fourth body part abuts against a lower surface of the second limiting protrusion through the second gap, a third clamping hook is formed on an outer side surface of the bottom wall part of the second clamping member, and the third clamping hook is fitted in the second clamping opening.

* * * * *